(12) United States Patent
Yang et al.

(10) Patent No.: US 6,768,655 B1
(45) Date of Patent: Jul. 27, 2004

(54) DISCONTINUOUS MODE PFC CONTROLLER HAVING A POWER SAVING MODULATOR AND OPERATION METHOD THEREOF

(75) Inventors: Ta-yung Yang, Milpitas, CA (US); Chern-Lin Chen, Taipei (TW); Jenn-yu G. Lin, Taipei (TW)

(73) Assignee: System General Corp., Taipei Hsien (TW)

( * ) Notice: Subject to any disclaimer, the term of this patent is extended or adjusted under 35 U.S.C. 154(b) by 19 days.

(21) Appl. No.: 10/357,842

(22) Filed: Feb. 3, 2003

(51) Int. Cl.[7] .............................................. H02M 3/335
(52) U.S. Cl. .............................. 363/21.01; 363/21.12; 363/21.18; 323/222
(58) Field of Search .......................... 363/21.01, 21.12, 363/21.17, 21.18; 323/222

(56) References Cited

U.S. PATENT DOCUMENTS

| | | | |
|---|---|---|---|
| 6,144,564 A | * 11/2000 | Fraidlin et al. | 363/16 |
| 6,465,991 B1 | * 10/2002 | Chang | 323/222 |
| 6,473,322 B2 | * 10/2002 | Marien et al. | 363/82 |
| 6,556,462 B1 | * 4/2003 | Steigerwald et al. | 363/89 |
| 6,636,430 B1 | * 10/2003 | Batarseh et al. | 363/21.01 |

OTHER PUBLICATIONS

"Power Factor Corrector" Publication No.: L6561/STMicroelectronics Group Company/Feb., 2001/p. 1–11.
"Power Factor Controllers" Publication No.: MC34262/ON Semiconductor/Mar., 2001/p. 1–19.
"Power–Factor Controller (PFC) IC for High Power Factor and Active Harmonic Filter" Publication No.: TDA 4862/Simens/Feb. 16, 1998/p. 1–17.

* cited by examiner

Primary Examiner—Bao Q. Vu
(74) Attorney, Agent, or Firm—J.C. Patents (57) ABSTRACT

The present invention discloses a ZCS discontinuous mode PFC controller having a power saving modulator. The controller turns on through the feedback resistor and the parasitic diode of the controller, thus eliminating the need for a startup resistor. To achieve ZCS, the inductor current is released to zero, while the switching signal is off, before the next switching cycle starts. In order to decrease the switching frequency for light load conditions, an off-time delay is inserted right before the start of every switching cycle. The off-time delay is modulated to be the function of the feedback voltage and supply voltage. When the supply voltage is lower than the limit voltage, the off-time delay will decrease to inhibit the decrease of a switching frequency therefore prevents a low supply voltage. The switching frequency is decreased in accordance with the decrease of the load. Consequently, the switching losses and power consumption for light load and no load conditions are reduced.

13 Claims, 5 Drawing Sheets

DISCONTINUOUS MODE PFC CONTROLLER HAVING A POWER SAVING MODULATOR AND OPERATION METHOD THEREOF

FIELD OF INVENTION

The present invention relates to a power factor correction (PFC) controller and an operation method thereof, and more particularly to a controller for a discontinuous mode PFC controller having a power saving modulator and operation method thereof

BACKGROUND OF THE INVENTION

Most power factor correction techniques incorporate and utilize a boost topology, which can be operated in either a continuous or a discontinuous inductor current mode at a fixed or a variable switching frequency. The continuous inductor current mode operated at a fixed switching frequency is used for higher power applications because of a low peak current applied and operated. For applications below 250 watts, the usage of the discontinuous inductor current mode operated with the variable switching frequency provides several advantages including small inductors, low costs, simple circuits, and zero current switching (ZCS). A pulse width of a power factor correction (PFC) controller is controlled by a voltage error amplifier, which is compared to a saw-tooth waveform generated by the controller. The pulse width varies with line and load conditions, but should be maintained constant for a half of a line cycle. Therefore, it is necessary for the voltage error amplifier to have a lower frequency bandwidth that below the line frequency.

The ZCS includes several advantages in applications. One advantage is that the inductor current must be released to zero before a next switching cycle is started which produces high switching efficiency. Since the change of the inductor current is equal to the peak inductor current and the current starts and returns to zero in each cycle, the current waveform has a triangular shape with an average value equal to one-half of the peak current multiplied by its time. Thus, the peak current is limited to exactly twice the average current. Since ZCS is switched right on the edging of the continuous and discontinuous current modes, the operation will be in variable switching frequency. Determined by the line input and output load, the pulse width of the switching signal is modulated, the switching frequency turns into low for heavy load conditions and becomes high in response to the light load conditions. The low-bandwidth pulse width modulation (PWM) incorporates ZCS to provide a natural power factor correction for the input current.

In recent prior arts, the ZCS varieties of the discontinuous current PFC controllers have been developed for the power factor correction control. Among them, the PFC controllers include the ST6561 of ST-Microelectronics, France; the MC34262 of ON-Semiconductor, Colorado; and the TDA4862 of Siemens, Germany. All of these controllers are designed to operate in a high frequency for a light load condition and/or no load condition. The switching losses of the power converter and the PFC booster are proportional to the switching frequency, in which the switching loss of the switching transistor, the power consumption of the snubber and the inductor losses are increased in accordance with a higher switching frequency. The drawback of the forgoing controllers is that under high frequency operation in the light load condition, it is difficult for the power converter to meet the energy conservation requirement, especially for light load and no load conditions. Therefore, it is desirable to provide a PFC controller that maintains the PFC function and provides low power consumption for light load.

SUMMARY OF THE INVENTION

An objective of the invention is to provide a zero current switching (ZCS) discontinuous mode PFC controller to provide high efficiency PFC, as well as reducing the power consumption of PFC controller under light load conditions.

Another objective of the invention is to eliminate the need of start-up resistors, which in turn, saves power.

Another objective of the invention is to provide a method of limiting the maximum output power of the PFC controller for under-voltage protection.

The present invention is related to a ZCS discontinuous mode PFC controller. When the line voltage is applied to the PFC converter, the feedback resistor and a parasitic diode of the controller startup the controller. Once the controller is turned on, a transistor will switch the feedback resistor to turn into the divider of the voltage feedback loop. For the PFC, an external resistor is used to determine the maximum on-time of the switching signal, thus limit the maximum output power. While the switching signal is off; the inductor current will be released to zero before the next switching cycle is started which achieves ZCS. In order to decrease the switching frequency for light load conditions, an off-time delay is inserted right before the start of every switching cycle. The feedback voltage, which is derived from the voltage feedback loop, and the supply voltage are taken as the variable. The off-time delay is modulated to be the function of the feedback voltage and supply voltage. A threshold voltage is a constant that defines the level of the light load. A limit voltage defines the low-level of the supply voltage. Once the feedback voltage decreases and is lower than the threshold voltage, the off-time delay will be increased accordingly. When the supply voltage is lower than the limit voltage, the off-time delay is decreased to inhibit the decrease of the switching frequency, therefore, preventing a low supply voltage. The switching frequency is decreased in accordance with the decrease of the load. Consequently, this reduces the switching losses and power consumption for light load and no load conditions.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
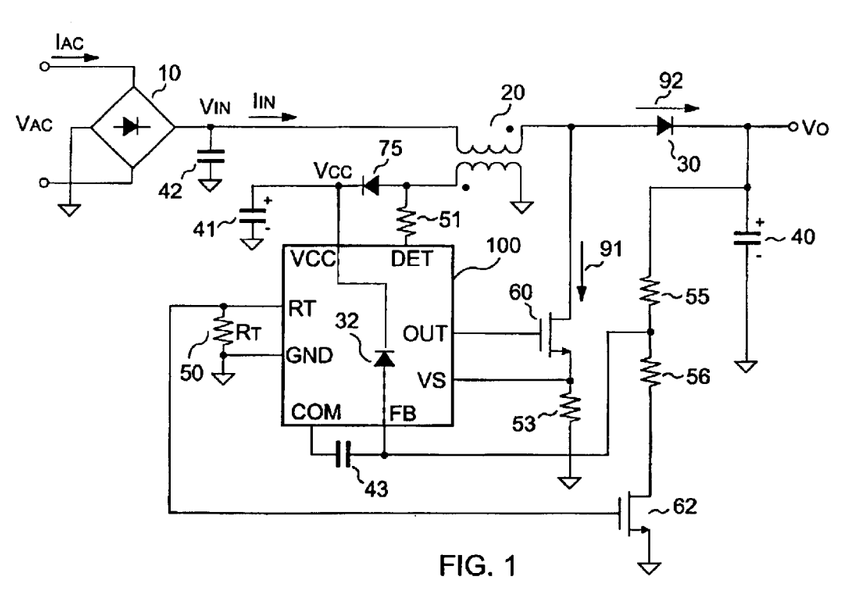
FIG. 1 is the schematic diagram of a discontinuous mode power factor correction (PFC) converter in accordance with a preferred embodiment of the present invention.

FIG. 1 is the schematic diagram of a discontinuous mode power factor correction (PFC) converter in accordance with a preferred embodiment of the invention. The PFC converter includes a bridge 10, an inductor 20, a rectifier 30, and a capacitor 40. For feedback operation, the PFC converter further includes a controller 100, capacitors 41 and 43, resistors 50, 51 and 53, a divider including a resistor 55 and a resistor 56, transistors 60 and 62 and a diode 75. Through the PFC converter an alternating current (AC) line input is converted towards a direct current (DC) output $V_O$, in which an switching current 91 controls energy by switching AC input via the inductor 20, rectifier 30 and capacitor 40. The purpose of the PFC converter is to control a current $I_{AC}$ waveform of the AC line input as sinusoidal and maintain a phase of $I_{AC}$ as the same as the AC line input voltage $V_{AC}$. Through the rectification of bridge 10, the $V_{IN}$ is always positive with respect to the ground of the PFC converter.

$$V_{IN}(t)=V_P \sin(\omega t);$$

where $V_P = \sqrt{2} \times V_{IN}$ (in root mean square "RMS" values)

The input current can similarly be expressed as:

$$I_{IN}(t)=I_P \sin(\omega t);$$

where $I_P = \sqrt{2} \times I_{IN}$ (RMS)

The input power of the PFC converter is then given by:

$$P_{IN}=V_P \times I_P/2$$

Taking the efficiency ($\eta$) into the equation, the output power is given by:

$$P_O=P_{IN} \times \eta$$

$$P_O=V_P \times I_P \times \eta/2 \quad (1)$$

Equation 1 can be expressed with regard to the input current $$I_P=(2 \times P_O)/(V_P \times \eta) \quad (2)$$

At the boundary conduction mode, the peak switching current ($I_{L-p}$) of the inductor 20 is exactly twice that of the average inductor current.

$$I_{L-P}=2 \times I_P$$

$$I_{L-P}=(4 \times P_O)/(V_P \times \eta) \quad (3)$$

The switching current 91 can be shown in its time variant form.

$$I_L(t)=(4 \times P_O)\sin(\omega t)/(V_P \times \eta) \quad (4)$$

The switching current 91 also can be solved for the on-time required to charge the inductor L to the peak current such as I=L(di/dt).

$$T_{ON}=I_{L-P} \times L/V_P$$

$$T_{ON}=(4 \times P_O \times L)/(V_P^2 \times \eta) \quad (5)$$

$$T_{OFF}=(I_{L-P} \times L)/(V_O-V_P)$$

$$T_{OFF}=(4 \times P_O \times L)/[(\eta \times V_P) \times (V_O-V_P)] \quad (6)$$

$$T=T_{ON}+T_{OFF}$$

Equation 5 can be expressed with regard to the output power.

$$P_O=[V_P^2 \times \eta/(4 \times L)] \times T_{ON} \quad (7)$$

According to the foregoing Equation 7, it is noted that the output power is controlled by the on-time $T_{ON}$. By constraining the maximum on-time, the maximum output power will be limited, especially for under voltage protection such as brownout conditions.

When the AC power is applied to the PFC converter, a DC voltage on the output voltage $V_O$ is produced via the bridge 10, inductor 20, rectifier 30 and capacitor 40. Through a feedback resistor 55 and a parasitic diode 32 of the controller 100, the output voltage $V_O$ charges the capacitor 41. A voltage $V_{CC}$ in an input terminal VCC (hereafter denoted as "VCC") of the controller 100 is the voltage level of the capacitor 41. Once the voltage $V_{CC}$ in the capacitor 41 is higher than a start-threshold voltage of the controller 100, the controller 100 will be turned on. At the instance the controller 100 turns on, a voltage such as 2 volts established at the RT output terminal (hereafter denoted as "RT") of the controller 100 will switch on the transistor 62. In the mean time, the resistor 56 is grounded. Resistors 55 and 56 form a divider of a feedback loop. Thus the joint resistance of the resistor 55 and 56 is connected to an FB input terminal (hereafter denoted as "FB") of the controller 100.

Figure 3:
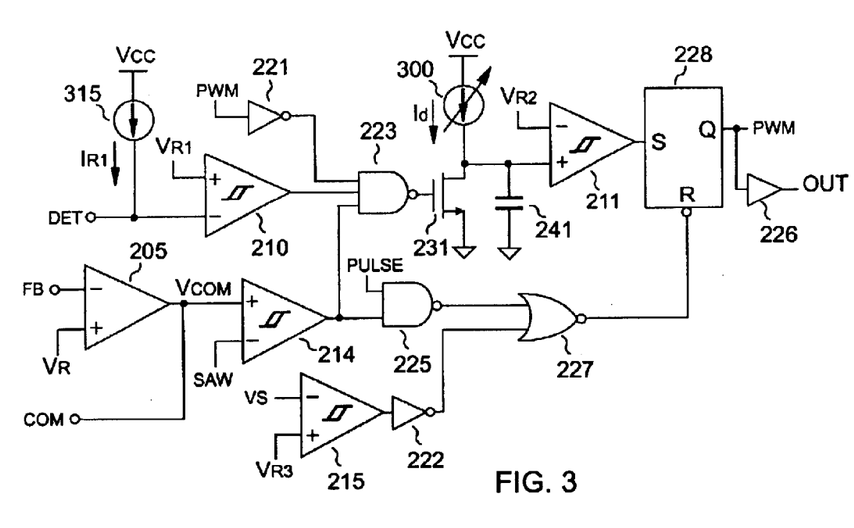
FIGS. 3, 4 and 5 are the schematic diagrams of the control circuit for discontinuous mode PFC converter of the preferred embodiment of the invention as shown in FIG. 1.

The FB input terminal and a COM output terminal (hereafter denoted as "COM") act as an input terminal and an output terminal of an error amplifier 205, as shown in FIG. 3 and will be described in details below. The capacitor 43 connected in between the FB and COM provides frequency compensation for a low frequency bandwidth that is below the line frequency. An OUT output terminal (hereafter denoted as "OUT") of the controller 100 outputs a switching signal to drive the transistor 60. After the controller 100 is turned on, an auxiliary winding of the inductor 20 charges the capacitor 41 via the diode 75 disposed between the terminals VCC and DET and supplies the power for the controller 100. The voltage in the capacitor 41 is kept higher than a stop-threshold voltage to maintain the operation and prevent the voltage $V_{CC}$ being at a low level within the controller 100.

Figure 2:
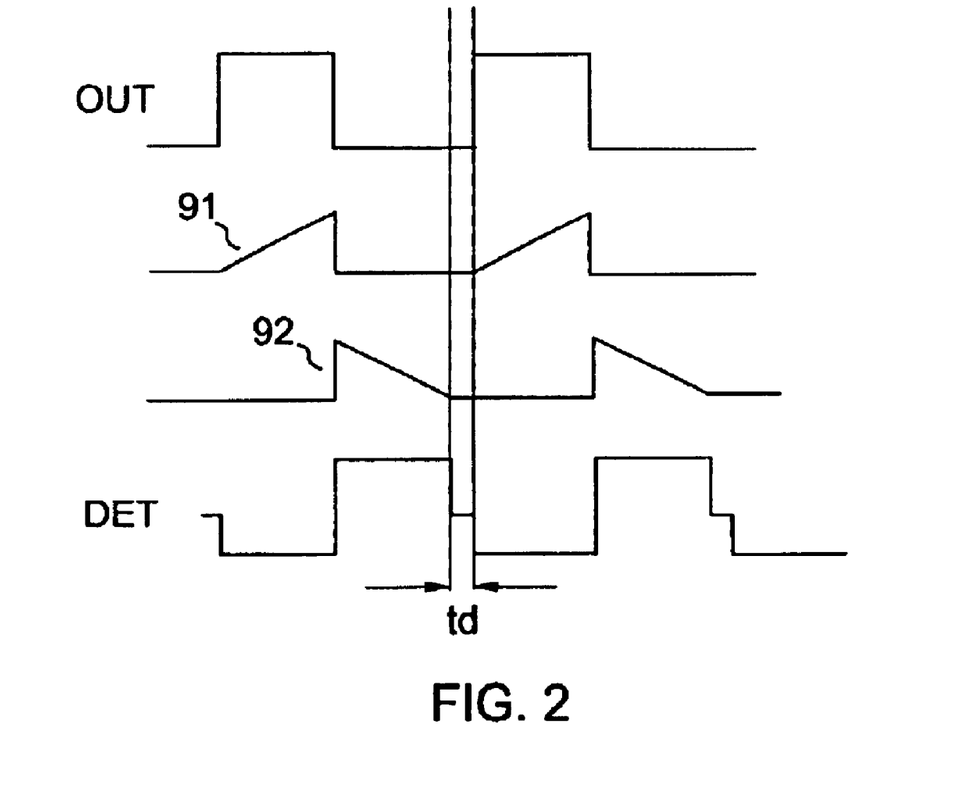
FIG. 2 shows the waveform of the discontinuous mode PFC converter of the preferred embodiment of the invention as shown in FIG. 1.

When the transistor 60 is driven on by the signal from the OUT of the controller 100, the inductor 20 is charged via the transistor 60. The resistor 53 senses a switching current 91 and is connected to an input terminal VS (hereafter denoted as "VS") of the controller 100. The signal from OUT would be switched off as long as a voltage level at the VS is higher than a limit voltage $V_{R3}$, which achieves a cycle-by-cycle current limit for the switching. While the transistor 60 is switched off by the signal from OUT, the energy stored in the inductor 20 is released to the output voltage $V_O$ via the rectifier 30 by the discharge current 92. The waveform is shown in FIG. 2. As soon as the discharge current 92 declines to zero, a zero voltage will be detected in the auxiliary winding of the inductor 20. An input terminal DET (hereafter denoted as "DET") of the controller 100 is connected to the auxiliary winding through the resistor 51, for detecting a zero current state. An off-time delay $t_d$ is initiated once the zero current state is detected. After the off-time delay $t_d$, the controller 100 is able to start the next switching cycle. The resistor 50 connected from the RT of the controller 100 to the ground (GND) determines the maximum on-time of the switching signal, such as the signal from OUT terminal.

Figure 4:
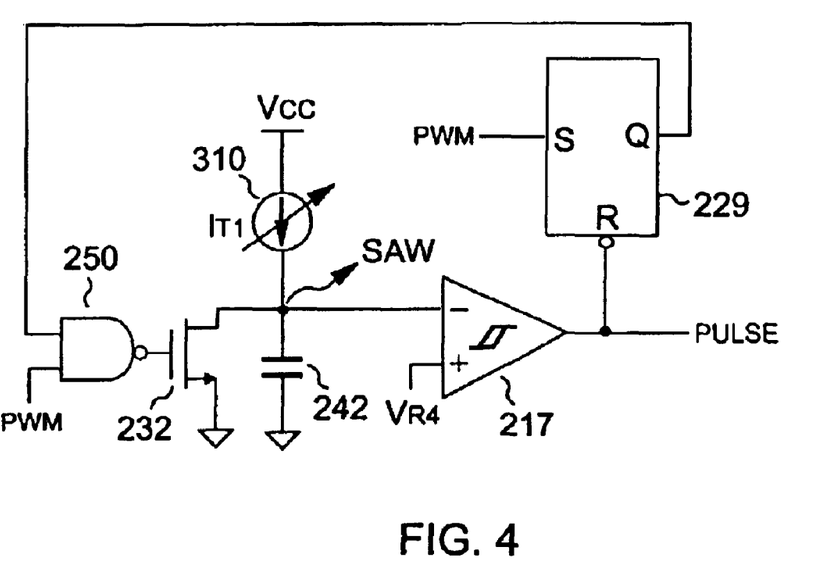
Figure 5:
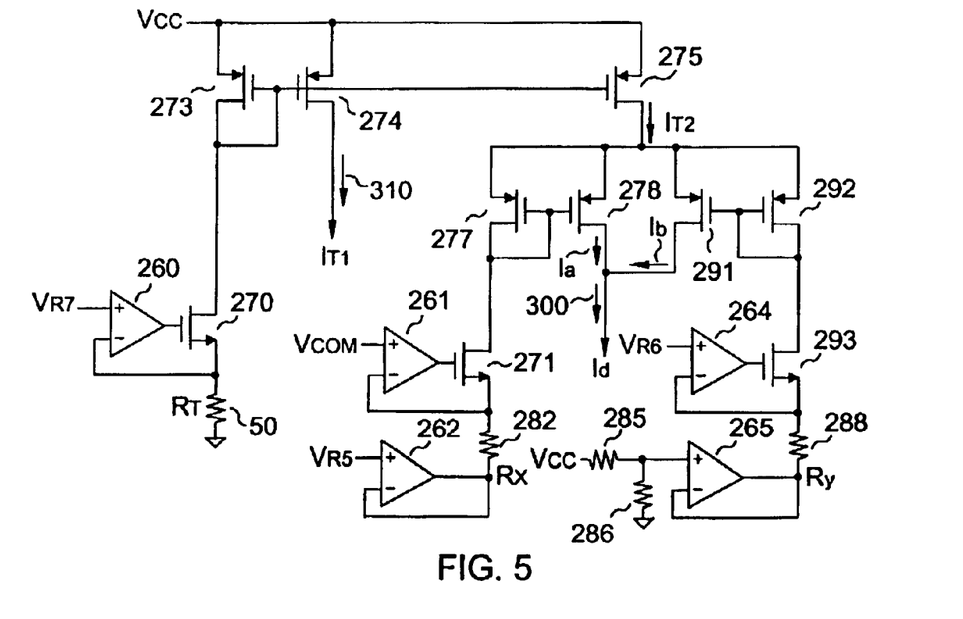

Referring to FIGS. 3, 4 and 5, which are schematic diagrams of a preferred embodiment of the control circuit 100 for the discontinuous mode PFC converter of the invention as shown in FIG. 1. Referring to FIG. 3, first, the control circuit 100 includes a constant current source 315, a delay current source 300, an error amplifier 205, comparators 210, 211, 214 and 215, inverters 221, 222 and a buffer 226, NAND gates 223, 225, a NOR gate 227 and a SR flip-flop 228. A current $I_{R1}$ generated by the constant current source 315 is applied to pull up a voltage level in the DET terminal of the controller 100. Once the voltage level of the DET is detected as a low signal, that is, the voltage level of the DET is lower than a first threshold voltage $V_{R1}$, the comparator 210 outputs a signal with a logic low state and then turns off the transistor 231 by the output of the NAND 223. An off-time delay $t_d$ shown in FIG. 2 is then initiated by switching off the transistor 231. A current $I_d$ generated by the delay current source 300 starts to charge the capacitor 241, and once the voltage level of the capacitor 241 is higher than a second threshold voltage $V_{R2}$, the comparator 211 will output a signal in a logic high state. By using the SR flip-flop 228, a switching signal PWM is then determined. The off-time delay can be stated as:

$$T_d = (C_{241} \times V_{R2})/I_d \quad (8)$$

where the $C_{241}$ is the capacitance of the capacitor 241.

The off-time delay $t_d$ is modulated to be a function of the feedback voltage and $V_{CC}$ voltage. The two inputs of the SR flip-flop 228 are respectively applied with the output of the comparator 211 and the feedback voltage from the FB terminal. The feedback voltage from the FB is applied to an input terminal of the error amplifier 205 and a reference voltage $V_R$ is applied to the other input terminal of the error amplifier 205, and then a voltage $V_{COM}$ is generated therefrom. The voltage $V_{COM}$ is then applied to a positive input terminal of the comparator 214 and a signal SAW is applied to a negative input terminal of the comparator 214. The output of the comparator 214 is then applied to one input terminal of the NAND gate 223 and one input terminal of the NAND gate 225. The other input terminal of the NAND gate 225 is applied with a PULSE signal. The signals SAW and PULSE will be described in detail later. The output of the NAND gate 225 is then applied to one input terminal of the NOR gate 227. The other input terminal of the NOR gate 227 is applied with output of the inverter 222. The output of the inverter 222 is a signal inverted from the output of the comparator 215. One input terminal of the comparator 215 is applied with a voltage from the VS terminal of the controller 100, as shown in FIG. 1. Another input terminal of the comparator 215 is applied with a third threshold voltage $V_{R3}$. By adjusting the voltage levels of the $V_{COM}$, the SAW signal and the PULSE signal, the off-time delay can be modulated to be a function of the feedback voltage by the SR flip-flop 228.

Referring to FIG. 3, the current $I_d$ from the delay-current 300 can be generated in according to the load condition. The circuit in FIG. 5 includes a first current mirror composed of transistors 273, 274 and 275, a second current mirror composed of transistors 277 and 278, and a third current mirror composed of transistors 291 and 292. A transistor 270 and a resistor 50 generate the mirror current in the first current mirror. A gate terminal of the transistor 270 is coupled to the output of an op-amplifier 260. A positive input terminal of the op-amplifier 260 is applied with a seventh threshold voltage $V_{R7}$ and a negative input terminal of the op-amplifier 260 is coupled to a source terminal of the transistor 270 and the resistor 50. The mirror current of the first current mirror is $V_{R7}/R_{50}$ and two currents $I_{T1}$ and $I_{T2}$ are respectively generated therefrom according to the width/length ratios of the transistors 274 and 275 compared with the transistor 273. Therefore, the current $I_{T1}$ is equal to $(V_{R7}/R_{50})(N_{274}/N_{273})$, where the $N_{274}$, $N_{273}$ are respectively the width/length ratios of the transistors 274 and 273. The current $I_{T2}$ is equal to $(V_{R7}/R_{50})(N_{275}/N_{273})$, where the $N_{275}$, $N_{273}$ are respectively the width/length ratios of the transistors 275 and 273.

The mirror current in the second current mirror is generated by a transistor 271 and a resistor 282. A gate terminal of the transistor 271 is coupled to the output of an op-amplifier 261. A positive input terminal of the op-amplifier 261 is applied with the $V_{COM}$, as shown in FIG. 3, and a negative input terminal of the op-amplifier 261 is coupled to a source terminal of the transistor 271 and one terminal of the resistor 282. The other terminal of the resistor 282 is coupled to the output terminal and a negative input terminal of an op-amplifier 262. A positive input terminal of the op-amplifier 262 is applied with a fifth threshold voltage $V_{R5}$. The mirror current of the second current mirror can be denoted as $(V_{COM} - V_{R5})/R_{282}$, where the $R_{282}$ is the resistance of the resistor 282.

The mirror current in the third current mirror is generated by a transistor 293 and a resistor 288. A gate terminal of the transistor 293 is coupled to the output of an op-amplifier 264. A positive input terminal of the op-amplifier 264 is applied with a sixth threshold voltage $V_{R6}$ and a negative input terminal of the op-amplifier 264 is coupled to a source terminal of the transistor 293 and one terminal of the resistor 288. The other terminal of the resistor 288 is coupled to the output terminal and a negative input terminal of the op-amplifier 265. A positive input terminal of the op-amplifier 265 is applied with a voltage generated from the $V_{CC}$ attenuated by resistors 285 and 286. The mirror current of the third current mirror can be denoted as $(V_{R6} - \alpha V_{CC})/R_{288}$, where the $R_{288}$ is the resistance of the resistor 288, $\alpha = R_{286}/(R_{286} + R_{285})$, $R_{286}$ and $R_{285}$ are respectively the resistance of the resistors 286 and 285.

The current $I_d$ for the delay current source 300, as shown in FIG. 3, can be obtained by adding a left mirrored current $i_a$ generated from the mirror current of the second current mirrored by the transistor 278 compared with the transistor 277 and a right mirrored current $i_b$ generated from the mirror current of the third current mirror by the transistor 291 compared with the transistor 292. The fifth threshold voltage $V_{R5}$ is a constant that defines a level of the light load. The sixth threshold voltage $V_{R6}$ is a limit voltage for defining a low-level of the $V_{CC}$ voltage. Once the decreasing voltage $V_{COM}$ is lower than the fifth threshold voltage $V_{R5}$, the off-time delay will be increased accordingly. When the attenuated $V_{CC}$ voltage is lower than the sixth threshold voltage $V_{R6}$, the off-time delay is decreased to inhibit the decrease of the switching frequency therefore prevents a low $V_{CC}$ voltage. The switching frequency is decreased in accordance with the decrease of the load. Consequently, this reduces the switching losses and power consumption for light load and no load conditions. The formulae are described as follows:

$$I_d = I_a + I_b$$

$$I_d = [(V_{COM} - V_{R5}/R_{282}) \times K_1 + [(V_{R6} - \alpha V_{CC})/R_{288}] \times K_2 \quad (9)$$

$$\alpha = R_{286}/(R_{286} + R_{285})$$

$$K_1 = N_{278}/N_{277};$$

$$K_2 = N_{291}/N_{292};$$

$$I_d \leq I_{T2}$$

Where $I_{T2} = (V_{R7}/R_{50}) \times (N_{275}/N_{273})$ $$I_{T1} = (V_{R7}/R_{50}) \times (N_{274}/N_{273}) \quad (10)$$

Referring to FIG. 4, which shows a circuit of a preferred embodiment of the signals SAW and PULSE as shown in FIG. 3. The circuit includes a comparator 217, a NAND gate 250, a transistor 232, a current source 310, a capacitor 242, and a SR flip-flop 229. The current $I_{T1}$ of the current source 310 is shown in FIG. 5. The switching signal PWM is applied to one input terminal of the NAND gate 250. The output terminal of the NAND gate 250 is applied to a gate terminal of the transistor 232. The transistor 232 is turned off once the switching signal PWM is high. The current $I_{T1}$ of the current source 310 starts to charge the capacitor 242 and generates a saw-tooth waveform SAW in the capacitor 242. The turned-off switching signal PWM will turn on the transistor 232 and then discharge the capacitor 242. The SAW signal is applied to a negative input terminal of the comparator 217 and a fourth threshold voltage $V_{R4}$ is applied to a positive input terminal of the comparator 217 and then the output terminal of the comparator 217 is the PULSE signal, which is applied to the SR flip-flop 229. The output of the SR flip-flop 229 is applied to the other input terminal of the NAND gate 250. As shown in FIG. 3, if the output of the error amplifier 205, $V_{COM}$, is lower than the voltage of the SAW signal or the voltage from the VS terminal is higher than the third threshold voltage $V_{R3}$, which is an over-current threshold voltage in an over-current condition, then the switching signal PWM will be turned off. If the switching signal PWM keeps high, then the saw-tooth waveform of the SAW signal will be discharged as long as the voltage level of the SAW signal is higher than the fourth threshold voltage $V_{R4}$. Therefore the maximum on-time of the switching signal PWM is determined by $(C_{242} \times V_{R4})/I_{T1}$, where the $C_{242}$ is the capacitance of the capacitor 242. >From Equation 10, the $I_{T1}$, is equal to $(V_{R7}/R_{50}) \times (N_{274}/N_{273})$, and the maximum on-time of the switching signal PWM is equal to $(R_{50} \times C_{242} \times V_{R4})/[V_{R7} \times (N_{274}/N_{273})]$. Therefore, the maximum on-time of the switching signal PWM is determined in accordance with the resistor 50, as shown in FIG. 1. The foregoing description can be expressed as:

$$T_{ON-MAX} = (C_{242} \times V_{R4})/I_{T1} \qquad (11)$$

$$T_{ON-MAX} = (R_{50} \times C_{242} \times V_{R4})/[V_{R7} \times (N_{274}/N_{273})] \qquad (12)$$

where $T_{ON-MAX}$ is the maximum on-time of the switching signal PWM.

Due to the maximum on-time of the switching signal PWM is limited, the switching devices of the PFC converter is protected from over-stress damage for under-voltage conditions.

According to the ZCS and the discontinuous mode PFC conversion of the invention, the next switching cycle is started at the boundary of zero inductor current state, wherein the off-time delay $t_d$ is almost zero. The energy is given by:

$$\epsilon = L \times I^2 / 2 \qquad (13)$$

The power supplied by the PFC boost converter can be expressed as:

$$P_O = [V_P^2 \times \eta \times T_{ON}^2 / (4 \times L \times T)] \qquad (14)$$

$T = T_{ON} + T_{OFF}$ is shown in Equations 5 and 6. When the load of the PFC converter is decreased in the light load condition, the off-time delay $t_d$ is increased accordingly and inserted before the start of the next switching cycle. Hence, the switching period T of the switching signal is extended as:

$$T = T_{ON} + T_{OFF} + t_d \qquad (15)$$

The switching frequency of the switching signal is thus decreased in light load and no load conditions. Therefore, the standby power is reduced. Furthermore, the feature of the off-time delay helps to keep the PFC function and maintain a stable output voltage $V_o$ ($V_o = P_o/I_o$) of the PFC converter in light load conditions. Referring to Equation 14, a very small $T_{ON}$ pulse width should be generated for an extremely light load condition. The extremely short $T_{ON}$ increases the difficulty of the PFC converter design. The limit on the short-pulse width of the Ton limits the performance of the power converter, hence, a dummy load has to be added at the output of the PFC converter to obtain a stable output voltage $V_O$. According to equation 14 and 15, it is shown that the insertion of the off-time delay $t_d$ of the invention extends the switching period T and eliminates the need of an extremely short $T_{ON}$. A stable output voltage $V_O$ is maintained and no dummy load is needed, which saves the power consumption in the PFC converter.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A discontinuous mode power factor correction (PFC) controller, used in a PFC converter, wherein the PFC converter comprising a bridge, an inductor, a rectifier and a main capacitor, a plurality of switching cycles being applied to the PFC converter, wherein the PFC controller comprising:

a VCC terminal, coupled to a first capacitor to supply power for the PFC controller;

a RT terminal, coupled to a gate terminal of a first transistor;

a GND terminal connected to the ground, a COM terminal;

a FB terminal, wherein a second capacitor is coupled between the COM terminal and the FB terminal for the frequency compensation, the FB terminal is coupled to the output of the PFC converter through a second resistor;

a DET terminal, coupled to an auxiliary winding of the inductor through a DET resistor for detecting a zero current state of the inductor, an OUT terminal, coupled to a gate terminal of a second transistor, wherein a drain terminal of the second transistor is coupled to a node between the inductor and the rectifier, a source terminal of the second transistor is coupled to the ground through a third resistor, wherein a switching signal is applied from the OUT terminal to the gate terminal of the second transistor; and a VS terminal, coupled between the source terminal of the second transistor and the third resistor, wherein a drain terminal of the first transistor is coupled to the second resistor through a fourth resistor and the FB terminal, wherein an off-time delay is inserted right before the start of each of the switching cycles, the off-time delay is modulated to be a function of a feedback voltage and a supply voltage, wherein the supply voltage is a voltage level in the VCC terminal, when the supply voltage is lower than a limit voltage, the off-time delay is decreased accordingly and a low supply voltage is prevented, and a switching frequency is decreased in accordance with the decrease of the load, and a first resistor is connected from the RT terminal to the ground, in which the first resistor determines the maximum on-time of the switching signal.

2. The discontinuous mode PFC controller of claim 1, wherein the controller further comprising:

a constant current source, for pulling up a voltage level in the DET terminal of the controller;

a third transistor, when the voltage level of the DET terminal is detected as a low signal, the third transistor is being turned off; and a delay current source, coupled to the third transistor and a third capacitor, the off-time delay is initiated by switching off the third transistor, the delay current source starts to charge the third capacitor, and turns on the switching signal once the voltage level of the third capacitor is higher than a second threshold voltage.

3. The discontinuous mode PFC controller of claim 2, wherein the controller further comprising an error amplifier, for receiving the feedback voltage and a reference voltage and outputting an amplified voltage, wherein the feedback voltage is the voltage in the FB terminal, and if the amplified voltage is lower than a voltage level of a fifth threshold voltage, the off-time delay is increased accordingly, the fifth threshold voltage is a constant that defines a level of a light load.

4. The discontinuous mode PFC controller of claim 3, wherein the controller further comprising a fourth comparator, having a negative input terminal for receiving the voltage level of the VS terminal of the controller and having a positive input terminal for receiving an over-current threshold voltage, if the voltage level of the VS terminal is higher than the over-current threshold voltage, the switching signal is turned off.

5. The discontinuous mode PFC controller of claim 2, wherein the current from the delay current source is generated by a circuit comprising:

a first current mirror coupled to the first resistor, for providing a first mirror current from the first resistor;

a second current mirror coupled to a fifth resistor, for providing a second mirror current from the fifth resistor, wherein one end of the fifth resistor is coupled to the amplified voltage and the other end of the fifth resistor is coupled to the fifth threshold voltage; and a third current mirror coupled to a sixth resistor, for providing a third mirror current from the sixth resistor, wherein one end of the sixth resistor is coupled to a sixth threshold voltage and the other end of the sixth resistor is coupled to a voltage divided from the voltage in the VCC terminal of the controller, wherein the constant current source for pulling up the voltage level in the DET terminal of the controller is determined according to the second mirror current and the third mirror current.

6. The discontinuous mode PFC controller of claim 5, wherein the fifth threshold voltage is a constant that defines a level of the light load, wherein once the amplified voltage is decreased to be lower than the fifth threshold voltage, the off-time delay is increased accordingly.

7. The discontinuous mode PFC controller of claim 5, wherein the sixth threshold voltage is a limit voltage for defining a low-level voltage in the VCC terminal of the controller, wherein when the voltage in the VCC terminal of the controller is lower than the limit voltage, the off-time delay is decreased to inhibit the decrease of the switching frequency therefore prevents the voltage in the VCC terminal of the controller being at a low voltage level, wherein the switching frequency is decreased in accordance with the decrease of the load, thereby the switching losses and power consumption for light load and no load conditions are reduced.

8. The discontinuous mode PFC controller of claim 1, wherein when the voltage level in the VCC terminal of the controller is attenuated to be lower than a limit voltage, the off-time delay is decreased to inhibit the decrease of a switching frequency therefore prevents a low voltage level in the VCC terminal of the controller, wherein the switching frequency is decreased in accordance with the decrease of the load, thereby the switching losses and power consumption for light load and no load conditions are reduced.

9. The discontinuous mode PFC controller of claim 1, comprising:

a constant current source, for pulling up a voltage level in the DET terminal of the controller;

a first comparator, having a positive input terminal for receiving a first threshold voltage and having a negative input terminal for receiving the voltage of the DET terminal of the controller;

a first NAND gate, for receiving the output of the first comparator and a signal inverted from the switching signal;

a third transistor, coupled to the first NAND gate, when the voltage level of the DET terminal is detected as a low signal, the third transistor is being turned off through the output of the first NAND gate;

a delay current source, coupled to the third transistor and a third capacitor, the off-time delay is initiated by switching off the third transistor, the delay current source starts to charge the third capacitor;

a second comparator, having a positive input terminal for receiving a second threshold voltage and having a negative input terminal for receiving the voltage of the third capacitor; and a SR flip-flop, for receiving the output of the second comparator and turning on the switching signal once the voltage level of the third capacitor is higher than the second threshold voltage.

10. The discontinuous mode PFC controller of claim 9, further comprising:

a error amplifier, having a positive input terminal for receiving the feedback voltage and having a negative input terminal for receiving a reference voltage and outputting an amplified voltage, wherein the feedback voltage is the voltage in the FB terminal, a third comparator, having a positive input terminal for receiving the amplified voltage and having a negative input terminal for receiving a SAW signal, the output terminal of the third comparator is applied to one input terminal of the first NAND gate;

a second NAND gate, having one input terminal for receiving the output terminal of the third comparator and having the other input terminal for receiving a PULSE signal;

a fourth comparator, having a negative input terminal for receiving the voltage in the VS terminal of the controller and having a positive input terminal for receiving the over-current threshold voltage;

a NOR gate, having one input terminal for receiving the output of the second NAND gate and having the other input terminal for receiving an inverted signal from the output terminal of the fourth comparator, the output of the NOR gate is applied to the SR flip-flop, wherein if the amplified voltage is lower than the fifth threshold voltage, the off-time delay is increased accordingly, the fifth threshold voltage is a constant that defines a level of a light load, when the voltage level in the VCC terminal of the controller is attenuated to be lower than a limit voltage, the off-time delay is decreased to inhibit the decrease of a switching frequency therefore prevents a low voltage level in the VCC terminal of the controller, wherein the switching frequency is decreased in accordance with the decrease of the load, thereby the switching losses and power consumption for light load and no load conditions are reduced.

11. The discontinuous mode PFC controller of claim 10, wherein a circuit for generating the signals SAW and PULSE comprising:

a current source;

a fourth capacitor, when the switching signal is high, the current source starts to charge the fourth capacitor and generates the saw-tooth waveform SAW, and when the switching signal is low, the fourth capacitor is discharged, and a fifth comparator, having a positive input terminal for receiving a fourth threshold voltage and a negative input terminal for receiving the SAW signal, and then output the PULSE signal.

12. An operating method for a zero current switching (ZCS) discontinuous mode PFC controller used in a discontinuous mode PFC converter, the operating method comprising:

when a line voltage is applied to the PFC converter, the controller being started up by a feedback resistor and a parasitic diode of the PFC controller, once the PFC controller being turned on, switching the feedback resistor to turn into a divider of a voltage feedback loop; and providing an external resistor connected to the PFC controller to determine a maximum on-time of a switching signal, thus limits the maximum output power, wherein while the switching signal is off, an inductor current of the PFC converter is released to zero before a next switching cycle is started which achieves zero current switching (ZCS), wherein in order to decrease the switching frequency for light load conditions, an off-time delay is inserted right before the start of every switching cycle, a feedback voltage derived from the voltage feedback loop and a supply voltage are taken as the variable.

13. The operating method for a zero current switching (ZCS) discontinuous mode power factor correction (PFC) controller used in a discontinuous mode power factor controller converter of claim 12, wherein the off-time delay is modulated to be a function of the feedback voltage and the supply voltage, wherein once the decrease of the feedback voltage is lower than a threshold voltage, the off-time delay is increased accordingly, wherein the threshold voltage is a constant that defines a level of a light load, when the supply voltage is lower than a limit voltage, the off-time delay is decreased to inhibit the decrease of the switching frequency, therefore, preventing a low supply voltage, wherein the limit voltage defines a low supply voltage level, the switching frequency is decreased in accordance with the decrease of the load, thereby the switching losses and power consumption for light load and no load conditions are reduced.

* * * * *